(12) United States Patent
Hiramatsu et al.

(10) Patent No.: US 12,368,355 B2
(45) Date of Patent: Jul. 22, 2025

(54) ROTOR CORE MANUFACTURING METHOD AND ROTOR CORE MANUFACTURING SYSTEM

(71) Applicant: AISIN CORPORATION, Aichi (JP)

(72) Inventors: Tomoko Hiramatsu, Kariya (JP); Tomoi Kojima, Kariya (JP)

(73) Assignee: AISIN CORPORATION, Kariya (JP)

( * ) Notice: Subject to any disclaimer, the term of this patent is extended or adjusted under 35 U.S.C. 154(b) by 650 days.

(21) Appl. No.: 17/630,232

(22) PCT Filed: Sep. 23, 2020

(86) PCT No.: PCT/JP2020/035759
§ 371 (c)(1),
(2) Date: Jan. 26, 2022

(87) PCT Pub. No.: WO2021/065614
PCT Pub. Date: Apr. 8, 2021

(65) Prior Publication Data
US 2022/0286030 A1    Sep. 8, 2022

(30) Foreign Application Priority Data
Sep. 30, 2019   (JP) ................................ 2019-180658

(51) Int. Cl.
*H02K 15/12* (2025.01)
*B29C 45/14* (2006.01)
(Continued)

(52) U.S. Cl.
CPC ....... *H02K 15/12* (2013.01); *B29C 45/14639* (2013.01); *H02K 15/02* (2013.01); *B29K 2705/12* (2013.01); *B29L 2031/7498* (2013.01)

(58) Field of Classification Search
None
See application file for complete search history.

(56) References Cited

U.S. PATENT DOCUMENTS

2012/0325552 A1   12/2012   Sakura
2014/0196276 A1    7/2014   Nagai et al.
(Continued)

FOREIGN PATENT DOCUMENTS

JP   2004-260881 A   9/2004
JP   2007-282392 A   10/2007
(Continued)

OTHER PUBLICATIONS

Machine English translation of JP-2016005396-A, Accessed Jun. 21, 2024 (Year: 2016).*
(Continued)

*Primary Examiner* — Jacob T Minskey
*Assistant Examiner* — Adrianna N Konves
(74) *Attorney, Agent, or Firm* — Oliff PLC

(57) ABSTRACT

This rotor core manufacturing method includes a step of moving a stacked core that remains mounted to a jig and that has a resin material injected in a magnet holding portion, from a resin injection apparatus to a curing heater apparatus that is separate from the resin injection apparatus, and a step of curing the resin material in the magnet holding portion by heating the stacked core in the curing heater apparatus.

8 Claims, 5 Drawing Sheets

(51) Int. Cl.
   *H02K 15/02*   (2006.01)
   *B29K 705/12*  (2006.01)
   *B29L 31/00*   (2006.01)

(56) References Cited

U.S. PATENT DOCUMENTS

| | | |
|---|---|---|
| 2016/0181896 A1 | 6/2016 | Masubuchi et al. |
| 2018/0166214 A1 | 6/2018 | Amano et al. |
| 2019/0089232 A1 | 3/2019 | Fukuyama |
| 2020/0099278 A1 | 3/2020 | Fukuyama et al. |
| 2021/0194338 A1 | 6/2021 | Ikeda et al. |
| 2021/0234440 A1 | 7/2021 | Murayama et al. |
| 2021/0242756 A1 | 8/2021 | Ikeda et al. |

FOREIGN PATENT DOCUMENTS

| | | |
|---|---|---|
| JP | 2008-245405 A | 10/2008 |
| JP | 4414417 B2 | 2/2010 |
| JP | 4848040 B2 | 12/2011 |
| JP | 2012-228032 A | 11/2012 |
| JP | 2013-162640 A | 8/2013 |
| JP | 5357217 B2 | 12/2013 |
| JP | 5373269 B2 | 12/2013 |
| JP | 2014-91220 A | 5/2014 |
| JP | 2014-138533 A | 7/2014 |
| JP | 2016-5396 A | 1/2016 |
| JP | 2016-123227 A | 7/2016 |
| JP | 6180569 B2 | 8/2017 |
| JP | 2018-098904 A | 6/2018 |
| JP | 6533635 B1 | 6/2019 |
| WO | 2017/179547 A1 | 10/2017 |

OTHER PUBLICATIONS

Machine English translation of JP2014091220, Accessed Sep. 13, 2024 (Year: 2014).*
Machine English translation of JP2016005396, Accessed Sep. 13, 2024 (Year: 2016).*
Jun. 16, 2020 International Search Report issued in International Patent Application No. PCT/JP2020/013724.
U.S. Appl. No. 17/430,975, filed Aug. 13, 2021 in the name of Tomoko Hiramatsu et al.
Dec. 1, 2020 International Search Report issued in International Patent Application No. PCT/JP2020/035757.
U.S. Appl. No. 17/625,038, filed Jan. 5, 2022 in the name of Tomoko Hiramatsu et al.
Apr. 21, 2022 Extended Search Report issued in European Patent Application No. 20778096.6.
Dec. 8, 2023 Office Action issued in U.S. Appl. No. 17/430,975.
Dec. 8, 2020 International Search Report issued in International Patent Application No. PCT/JP2020/035759.
Oct. 27, 2022 Search Report issued in European Patent Application No. 20871060.8.

* cited by examiner

ROTOR CORE MANUFACTURING METHOD AND ROTOR CORE MANUFACTURING SYSTEM

TECHNICAL FIELD

The present disclosure relates to a rotor core manufacturing method and a rotor core manufacturing system.

BACKGROUND ART

Rotor core manufacturing methods and rotor core manufacturing systems that inject a resin material into a magnet holding portion in which a permanent magnet is inserted are conventionally known. Such a rotor core manufacturing method and rotor core manufacturing system is disclosed in, for example, Japanese Patent No. 6180569 (JP 6180569).

In the method disclosed in JP 6180569, a permanent magnet is inserted in each of a plurality of magnet insertion holes in a stacked rotor core in which a plurality of core pieces is stacked together, and the permanent magnet is resin-sealed in each magnet insertion hole. Specifically, JP 6180569 discloses a resin sealing apparatus that is capable of heating and melting resin and that is capable of supplying the molten resin into the magnet insertion holes in the stacked rotor core. The resin sealing apparatus is provided with an upper die and a lower die that are structured to be capable of pressing the stacked rotor core by sandwiching the stacked rotor core therebetween (in the direction of the axis of the stacked rotor core).

Further, the resin sealing apparatus is structured to heat and melt resin that is stored in the resin sealing apparatus and to supply the molten resin into each of the magnet insertion holes in the stacked rotor core, while pressing the stacked rotor core by the upper die and the lower die. This suppresses leakage of the resin supplied in the magnet insertion holes from between electrical steel sheets. In addition, the resin sealing apparatus is structured to thermally cure the resin in each of the magnet insertion holes by maintaining the heating state for a predetermined period of time even after each magnet insertion hole is filled with the resin.

RELATED ART DOCUMENTS

Patent Documents

Patent Document 1: JP 6180569

SUMMARY OF THE DISCLOSURE

Problem to be Solved by the Invention

However, according to the method of manufacturing a rotor core (a stacked rotor core) disclosed in JP 6180569, a step of supplying resin into each magnet insertion hole and a step of thermally curing the resin are both performed in the same resin sealing apparatus. This may excessively increase the time for which the resin sealing apparatus is occupied. In this case, when a plurality of rotor cores is manufactured in succession on a manufacturing line where a plurality of apparatuses performs steps in turn, there is a disadvantage in that the stacked core which has undergone a step before the resin sealing apparatus waits for a longer time to proceed to a step in the resin sealing apparatus. For this reason, there is a problem in that since a longer time is required to manufacture a plurality of rotor cores, productivity decreases.

The present disclosure addresses a problem like the one described above. One purpose of the present disclosure is to provide a rotor core manufacturing method and a rotor core manufacturing system that are capable of suppressing a decrease in rotor core productivity when manufacturing a plurality of rotor cores in succession.

Means for Solving the Problem

To achieve the above purpose, a rotor core manufacturing method according to a first aspect of the present disclosure includes: a step of preparing a stacked core in which a plurality of electrical steel sheets is stacked together and that has a magnet holding portion extending in a stack direction of the plurality of electrical steel sheets; a step of placing a permanent magnet in the magnet holding portion; a step of mounting the stacked core to a jig that presses the stacked core in the stack direction; a step of injecting a resin material in a molten state into the magnet holding portion in a resin injection apparatus, while the stacked core remains mounted to the jig and while the permanent magnet remains inserted in the magnet holding portion; a step of moving the stacked core that remains mounted to the jig and that has the resin material injected in the magnet holding portion, from the resin injection apparatus to a curing heater apparatus that is separate from the resin injection apparatus, and a step of curing the resin material in the magnet holding portion, after the step of moving the stacked core to the curing heater apparatus, by heating the stacked core that remains mounted to the jig and that has the resin material injected in the magnet holding portion in the curing heater apparatus.

As described above, the rotor core manufacturing method according to the first aspect includes: the step of moving the stacked core that remains mounted to the jig from the resin injection apparatus to the curing heater apparatus, and the step of curing the resin material in the magnet holding portion by heating the stacked core that remains mounted to the jig in the curing heater apparatus that is separate from the resin injection apparatus. This ensures that the step of injecting the resin material and the step of curing the resin material are performed in separate apparatuses, thus allowing prevention of an excessive increase in the time for which the resin sealing apparatus is occupied. That is, when a plurality of rotor cores is manufactured in succession on a manufacturing line where a plurality of apparatuses performs steps in turn, it is possible to prevent the stacked core that has undergone a step before the resin injection step from waiting for a much longer time to proceed to the resin injection step. This permits a reduction in rotor core manufacturing time when a plurality of rotor cores is manufactured in succession, thus allowing a suppression of decrease in rotor core productivity. Further, since the stacked core is moved from the resin injection apparatus to the curing heater while mounted to the jig, it is possible to prevent the resin material from leaking from between the electrical steel sheets during the movement.

A rotor core manufacturing system according to a second aspect of the present disclosure is a system of manufacturing a rotor core in which a plurality of electrical steel sheets is stacked together and that has a magnet holding portion extending in a stack direction of the electrical steel sheets. The system includes: a resin injection apparatus configured to inject a resin material in a molten state into the magnet holding portion of the stacked core, while the stacked core remains mounted to a jig that presses the stacked core in the stack direction and while a permanent magnet remains inserted in the magnet holding portion; a curing heater apparatus configured to cure the resin material in the magnet holding portion by heating the stacked core that remains mounted to the jig and that has the resin material injected in the magnet holding portion, and a moving mechanism configured to move the stacked core that remains mounted to the jig and that has the resin material injected in the magnet holding portion, from the resin injection apparatus to the curing heater apparatus.

As described above, the rotor core manufacturing system according to the second aspect of the present disclosure is a rotor core manufacturing system including the moving mechanism configured to move the stacked core that remains mounted to the jig from the resin injection apparatus to the curing heater apparatus, and the curing heater apparatus provided separately from the resin injection apparatus and configured to cure the resin material in the magnet holding portion by heating the stacked core that remains mounted to the jig. This ensures that the step of injecting the resin material and the step of curing the resin material are performed in separate apparatuses, thus allowing prevention of an excessive increase in the time for which the resin sealing apparatus is occupied. That is, when a plurality of rotor cores is manufactured in succession on a manufacturing line where a plurality of apparatuses performs steps in turn, it is possible to prevent the stacked core that has undergone a step before the resin injection step from waiting for a much longer time to proceed to the resin injection step. This permits a reduction in rotor core manufacturing time when a plurality of rotor cores is manufactured in succession, thus making it possible to provide a rotor core manufacturing system capable of suppressing a reduction in rotor core productivity. Further, since the moving mechanism moves the stacked core that remains mounted to the jig from the resin injection apparatus to the curing heater, it is possible to provide a rotor core manufacturing system capable of preventing the resin material from leaking from between the electrical steel sheets during the movement.

Effects of the Invention

The present disclosure is capable of suppressing a reduction in rotor core productivity when a plurality of rotor cores is manufactured in succession.

MODES FOR CARRYING OUT THE DISCLOSURE

Figure 1:
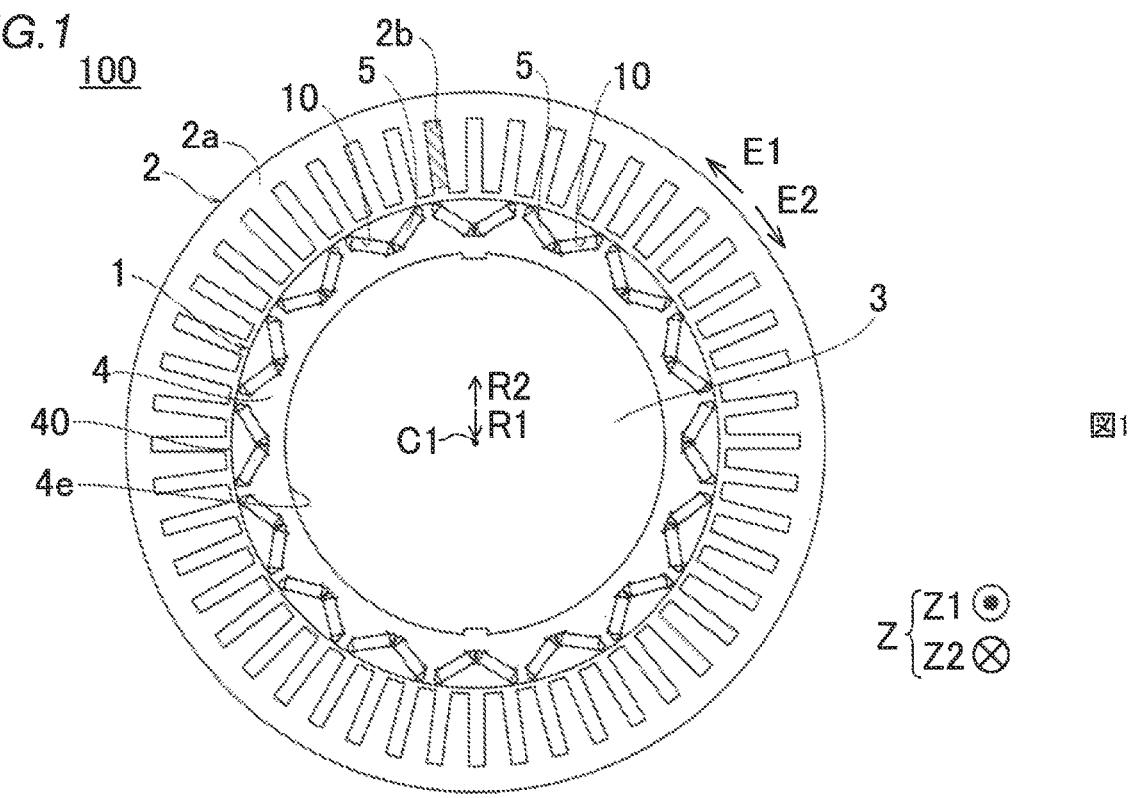
FIG. 1 is a plan view illustrating the structure of a rotor (a rotating electrical machine) according to the present embodiment.

An embodiment of the present disclosure is described below with reference to the drawings.

Present Embodiment

Referring to FIGS. 1 to 7, a manufacturing method for a rotor core 4 and a manufacturing system for the rotor core 4, according to the present embodiment, are described.

In the present description, an "axial direction" refers to directions along a rotational axis C1 of a rotor 1 (the rotor core 4) and corresponds to a direction Z illustrated in the drawings. Further, a "stack direction" refers to directions in which electrical steel sheets 4a of the rotor core 4 (refer to FIG. 3) are stacked together and corresponds to the direction Z illustrated in the drawings. In addition, a "radial direction" refers to a radial direction (a direction R1 or a direction R2) of the rotor 1 (the rotor core 4), and a "circumferential direction" refers to a circumferential direction (a direction E1 or a direction E2) of the rotor 1 (the rotor core 4).
(Rotor Core Structure)

First, referring to FIG. 1, the structure of the rotor core 4 according to the present embodiment is described.

As illustrated in FIG. 1, a rotating electrical machine 100 is provided with the rotor 1 and a stator 2. Further, the rotor 1 and a stator 2 are each annularly shaped. The rotor 1 is located radially inside the stator 2 to face each other. That is, according to the present embodiment, the rotating electrical machine 100 is structured as an inner-rotor-type rotating electrical machine. A shaft 3 is located radially inside the rotor 1. The shaft 3 is coupled to an engine and an axle via a member that transmits a rotational force, such as a gear. For example, the rotating electrical machine 100 is structured as a motor, a generator, or a motor-generator and is structured to be mounted on a vehicle.

The rotor core 4 is provided with a stacked core 4d in which the plurality of electrical steel sheets 4a (refer to FIG. 3) is stacked together and that has a magnet holding portion 10 extending in the stack direction of the electrical steel sheets 4a. The rotor core 4 is further provided with a permanent magnet 5 that is inserted in the magnet holding portion 10 of the stacked core 4d. A plurality of (32 in the present embodiment) magnet holding portions 10 is provided in the stacked core 4d. Thus, the rotating electrical machine 100 is structured as an interior permanent magnet motor (IPM motor). The magnet holding portions 10 are positioned in a radially outer portion of the stacked core 4d (the rotor core 4). That is, distances from the magnet holding portions 10 to an outer circumferential surface 40 of the stacked core 4d (the rotor core 4) are less than distances from the magnet holding portions 10 to an inner circumferential surface 4e of the stacked core 4d (the rotor core 4). Further, two of the magnet holding portions 10 that are adjacent to each other are arranged in a V-shape. It is noted that the arrangement of the magnet holding portions 10 is not limited to this.

The stator 2 includes a stator core 2a and a coil 2b mounted in the stator core 2a. The stator core 2a is structured, for example, by stacking a plurality of electrical steel sheets (silicon steel sheets) together in the axial direction in such a manner as to allow magnetic flux to pass therethrough. The coil 2b is coupled to an external power supply portion and is structured to be supplied with electric power (e.g., three-phase alternating current power). Further, the coil 2b is structured to generate a magnetic field by being supplied with electric power. The rotor 1 and the shaft 3 are structured to rotate with respect to the stator 2 together with driving of an engine or the like, even when no electric power is supplied to the coil 2b. Although FIG. 1 illustrates only part of the coil 2b, the coil 2b is mounted over the entire circumference of the stator core 2a.

The permanent magnet 5 is rectangular in cross section perpendicular to the axial direction of the stacked core 4d (the rotor core 4). For example, the permanent magnet 5 is structured to have a direction of magnetization (a magnetized direction) along the short sides thereof.

Further, the rotor core 4 is provided with a resin material 6 (refer to FIG. 3) that fills the magnet holding portions 10. The resin material 6 is provided to fix the permanent magnets 5 placed in the magnet holding portions 10. The resin material 6 is structured of a material (thermosetting resin) that melts at a first temperature T1 and that cures at a second temperature T2 greater than the first temperature T1. Specifically, the resin material 6 is solid (in the form of flakes, pellets, powder, etc.) at ordinary temperatures that are less than the first temperature T1, but melts when the temperature of the resin material 6 becomes greater than or equal to the first temperature T1 by being heated from the ordinary temperatures. Further, the resin material 6 is structured to remain in a molten state (not to cure) at a temperature greater than or equal to the first temperature T1 and less than the second temperature T2. Moreover, the resin material 6 is structured to cure when heated to a temperature greater than or equal to the second temperature T2. It is noted that illustration of the resin material 6 is omitted in FIG. 1 for brevity.

For example, a synthetic resin material such as disclosed in Japanese Unexamined Patent Application Publication No. 2000-239642 (JP 2000-239642 A) may be used as the resin material 6. That is, the resin material 6 includes a reactive hot melt adhesive composition that contains 10-100% of a first compound having at least 100 eq/T of uretdione rings, 0-90% of a second compound having active hydrogen groups at molecular ends, and 0-90% of a third compound having glycidyl groups, and the reactive hot melt adhesive composition is characterized in that none of the first to third compounds have isocyanate groups at molecular ends.

(Jig Structure)

Figure 2:
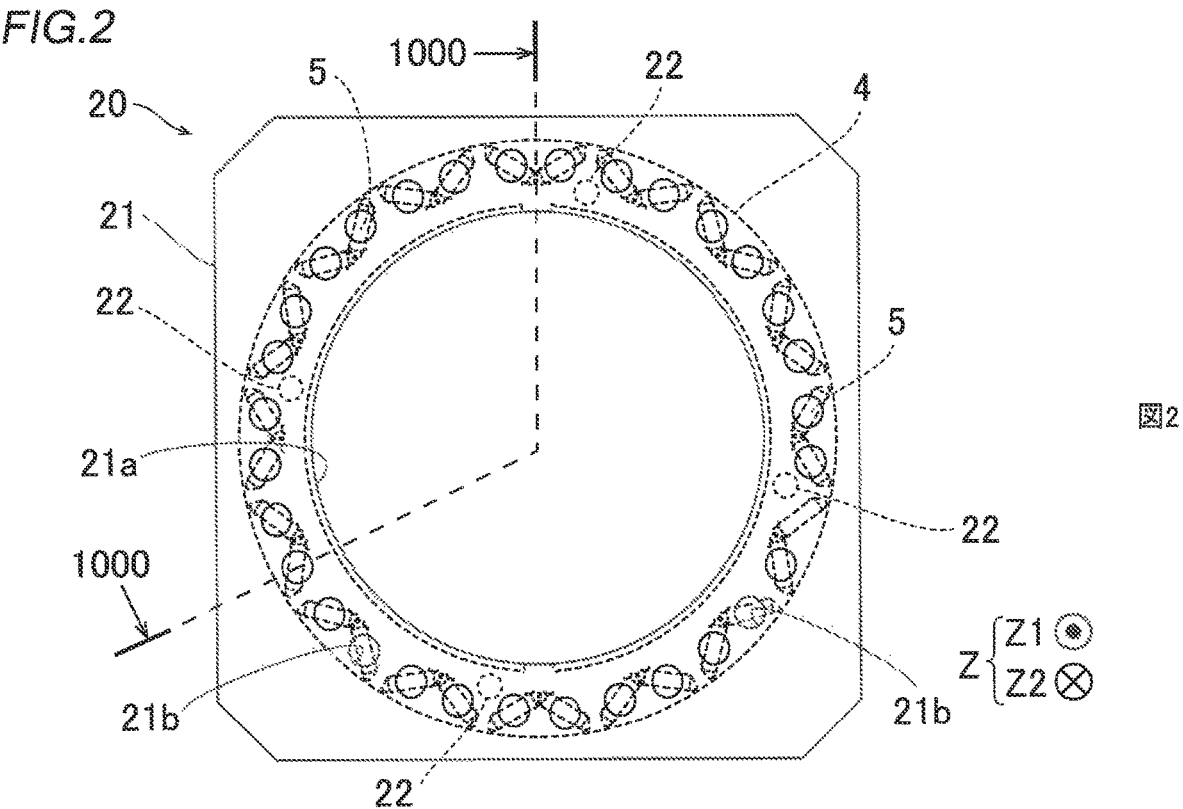
FIG. 2 is a plan view illustrating the structure of a jig (an upper plate) that presses a rotor core according to the present embodiment.
Figure 3:
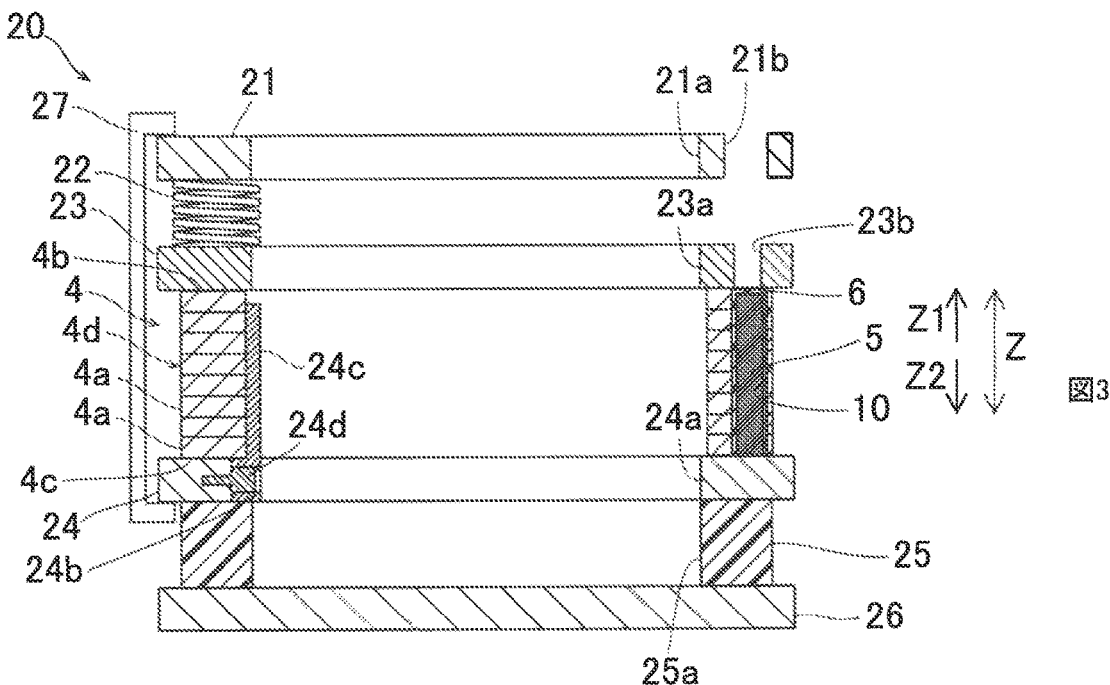
FIG. 3 is a cross-sectional view (a cross-sectional view taken along line 1000-1000 in FIG. 2) illustrating the jig that presses the stacked core and illustrating a finished rotor core mounted to the jig according to the present embodiment.
Figure 4:
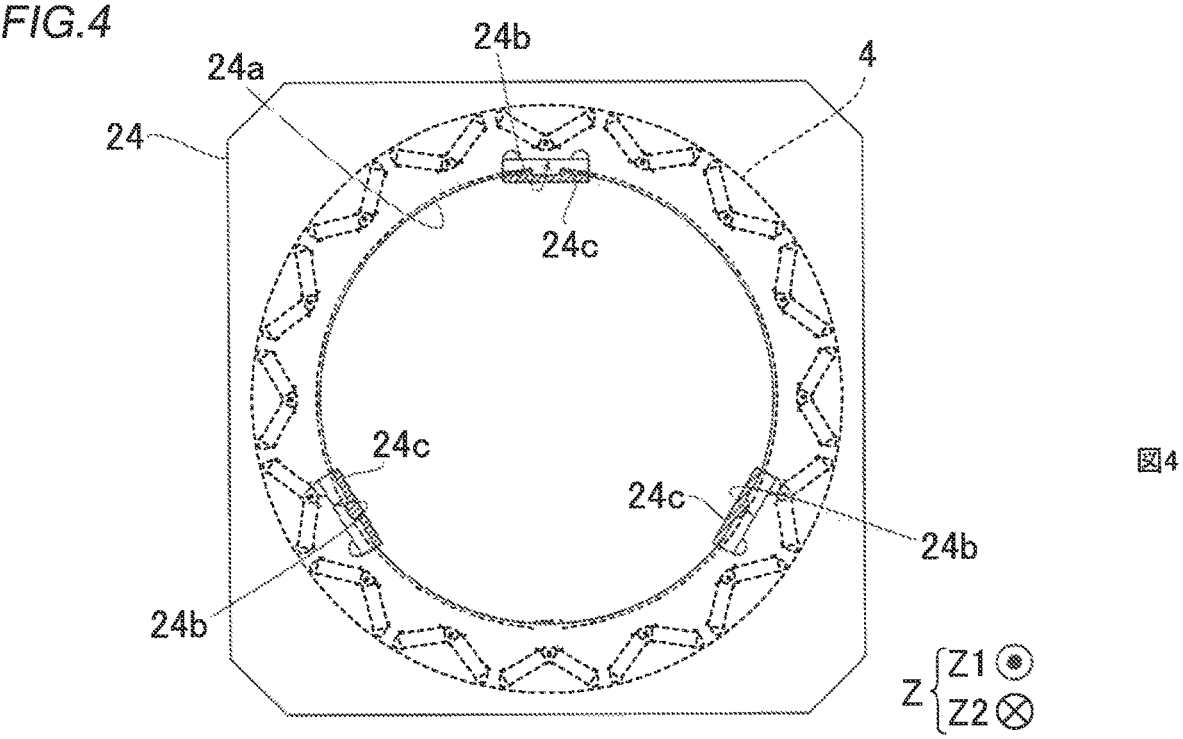
FIG. 4 is a plan view illustrating the structure of a lower plate of the jig that presses the rotor core according to the present embodiment.

Next, referring to FIGS. 2 to 4, the structure of a jig 20 according to the present embodiment is described. It is noted that the description below describes the structure of the jig 20 in a state where the stacked core 4d is already mounted to the jig 20.

As illustrated in FIG. 2, the jig 20 includes an upper plate 21. Further, as illustrated in FIG. 3, the jig 20 includes a pressing spring 22, a pressing plate 23, a lower plate 24, a thermal insulator 25, a positioning plate 26, and a clamping member 27. It is noted that the upper plate 21, the pressing plate 23, the lower plate 24, and the positioning plate 26 are all made of stainless steel (SUS).

As illustrated in FIG. 2, the upper plate 21 has a through hole 21a in the center thereof and is annularly shaped. Further, the upper plate 21 includes a plurality of resin injection holes 21b. The resin injection holes 21b are provided such that nozzles 103a of a resin injection apparatus 103 (refer to FIG. 7) that is described later are insertable therein. Specifically, the resin injection holes 21b are provided in such a manner as to individually overlap the plurality of (32 in the present embodiment) magnet holding portions 10.

An induction heating coil 102a (refer to FIG. 7) of a preheating heater apparatus 102 (refer to FIG. 5) that is described later is inserted radially inside the stacked core 4d via both the through hole 21a in the upper plate 21 and a through hole 23a in a pressing plate 23 that is described later. Further, although not illustrated in the drawings, an induction heating coil that is provided to the curing heater apparatus 104 is also inserted radially inside the stacked core 4d via both the through hole 21a in the upper plate 21 and the through hole 23a in the pressing plate 23 that is described later.

The pressing spring 22 is provided between the upper plate 21 and the pressing plate 23. Specifically, a plurality of pressing springs 22 is provided at equal angular intervals in the circumferential direction when viewed in the direction of the rotational axis C1. It is noted that in the present embodiment, four pressing springs 22 are provided. Each of the a plurality of pressing springs 22 is provided at a position that overlaps the stacked core 4d, when viewed from above (from the direction Z1), in a state where the stacked core 4d is already mounted to the jig 20.

Further, as illustrated in FIG. 3, the pressing plate 23 is located on a top surface 4b of the stacked core 4d. The pressing plate 23 is provided in such a manner as to press the top surface 4b of the stacked core 4d by using biasing forces of the pressing springs 22.

Likewise, the pressing plate 23 has the through hole 23a in the center thereof and is annularly shaped. Further, the pressing plate 23 includes a plurality of resin injection holes 23b. The plurality of resin injection holes 23b is provided at positions that overlap the plurality of resin injection holes 21b in the upper plate 21 when viewed from above (from the direction Z1). It is noted that the resin injection holes 23b are provided such that the nozzles 103a of the resin injection apparatus 103 (refer to FIG. 7) that is described later are insertable therein.

The stacked core 4d is placed (put) on the lower plate 24. That is, the lower plate 24 is in contact with a bottom surface 4c of the stacked core 4d. The lower plate 24 has a through hole 24a in the center thereof and is annularly shaped. Further, the lower plate 24 includes a plurality of (three in the present embodiment) cut portions 24b. The plurality of cut portions 24b is provided in the inner circumferential edge of the through hole 24a at almost equal angular intervals (refer to FIG. 4).

Each of the plurality of cut portions 24b is provided with an L-shaped positioning portion 24c. The radial and circumferential positions of the stacked core 4d relative to the lower plate 24 are decided by the plurality of positioning portions 24c. The positioning portions 24c are fixed (fastened) to the lower plate 24 by fastening bolts 24d.

Further, the thermal insulator 25 is provided in such a manner as to be held between the lower plate 24 and the positioning plate 26. The thermal insulator 25 has a through hole 25a in the center thereof and is annularly shaped. Further, the thermal insulator 25 is made of resin.

The positioning plate 26 is provided below the lower plate 24 (in the direction Z2). The positioning plate 26 is used to position the jig 20 in apparatuses (101 to 104) that are described later.

The clamping member 27 has a U-shape and is provided in such a manner as to clamp the upper plate 21 and the lower plate 24 together. Thus, the stacked core 4d is held and pressed between the upper plate 21 and the lower plate 24 in a vertical direction (in the direction Z). Specifically, the upper plate 21 holds and presses the stacked core 4d indirectly via the pressing plate 23 in conjunction with the lower plate 24. As a result, the stacked core 4d is fixed to the jig 20. A plurality of (four in the present embodiment)

clamping members 27 is provided. The plurality of clamping members 27 is provided at almost equal angular intervals (i.e., at intervals of 90 degrees) in the circumferential direction when viewed in the direction of the rotational axis C1.

(Rotor Core Manufacturing System)

Figure 5:
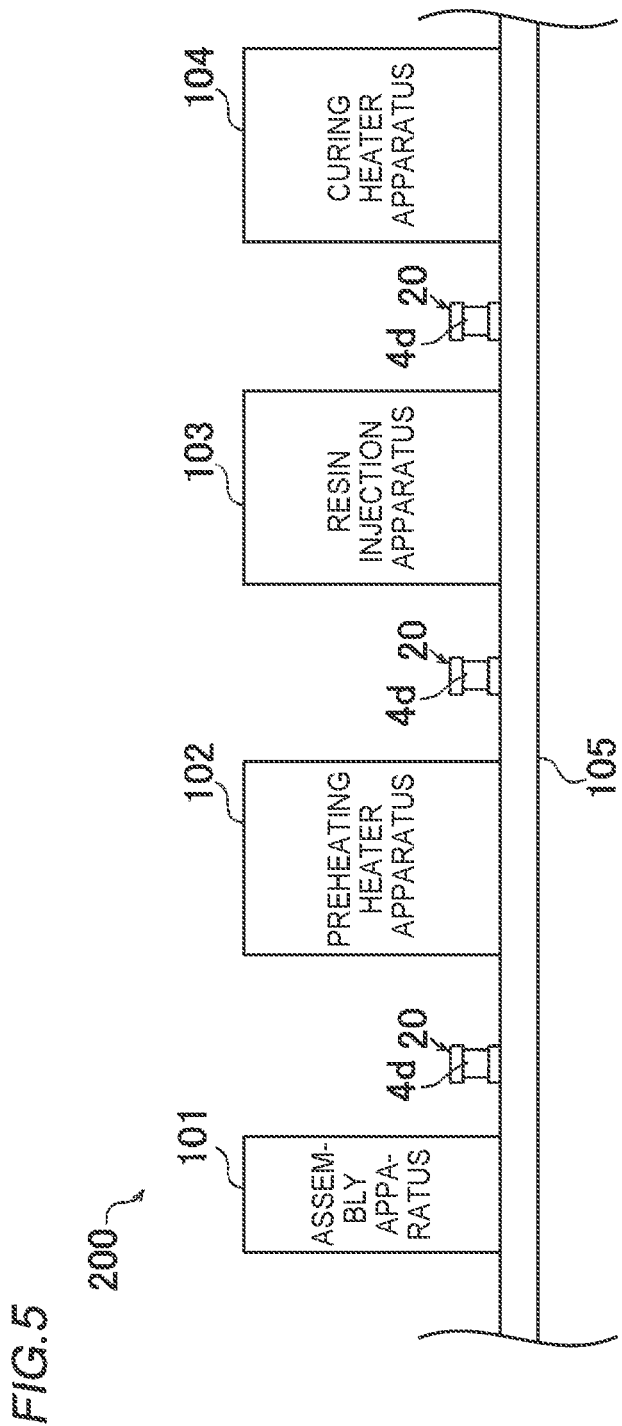
FIG. 5 is a schematic diagram illustrating the structure of a rotor core manufacturing system according to the present embodiment.

Next, referring to FIG. 5, a manufacturing system 200 for the rotor core 4 is described.

As illustrated in FIG. 5, the manufacturing system 200 for the rotor core 4 is provided with an assembly apparatus 101, a preheating heater apparatus 102, the resin injection apparatus 103, and a curing heater apparatus 104. The manufacturing system 200 for the rotor core 4 is further provided with a transfer conveyor 105 that transfers the stacked core 4d. It is noted that the assembly apparatus 101, the preheating heater apparatus 102, the resin injection apparatus 103, and the curing heater apparatus 104 are separate from each other. The transfer conveyor 105 is one example of a "transfer mechanism" and a "moving mechanism" recited in the claims.

The assembly apparatus 101 is structured to mount (assemble) the stacked core 4d to the jig 20. Specifically, the assembly apparatus 101 is structured to mount the stacked core 4d to the jig 20 and to place (insert) the permanent magnets 5 in the magnet holding portions 10.

The preheating heater apparatus 102 is structured to perform preheating by heating the stacked core 4d. Specifically, the preheating heater apparatus 102 is structured to perform preheating by heating the stacked core 4d that remains mounted to the jig 20 at a temperature greater than or equal to the first temperature T1 (e.g., 50° C.) and less than the second temperature T2 (e.g., 120° C.). It is noted that the first temperature T1 is a temperature at which the resin material 6 melts (a temperature at which the melting starts). On the other hand, the second temperature T2 is a temperature at which the resin material 6 cures (thermally cures) (a temperature at which the curing (the thermal curing) starts) and that is greater than the first temperature T1.

The resin injection apparatus 103 is structured to inject the resin material 6 into the magnet holding portions 10. Specifically, the resin injection apparatus 103 is structured to inject the resin material 6 that has been melted at the first temperature T1 or greater into the magnet holding portions 10, while the stacked core 4d remains mounted to the jig 20 and while the permanent magnets 5 remain inserted in the magnet holding portions 10.

The curing heater apparatus 104 is structured to cure the resin material 6 in the magnet holding portions 10 by heating the stacked core 4d. Specifically, the curing heater apparatus 104 is structured to cure the resin material 6 in the magnet holding portions 10 by heating the stacked core 4d that remains mounted to the jig 20 and that has the resin material 6 injected in the magnet holding portions 10, at a temperature greater than or equal to the second temperature T2 that is a temperature at which the resin material 6 cures.

It is noted here that according to the present embodiment, the transfer conveyor 105 is structured to move (transfer) the stacked core 4d that remains mounted to the jig 20 and that has the resin material 6 injected in the magnet holding portions 10, from the resin injection apparatus 103 to the curing heater apparatus 104. The transfer conveyor 105 is structured to transfer the stacked core 4d that remains mounted to the jig 20, from the assembly apparatus 101 to the preheating heater apparatus 102 to the resin injection apparatus 103 to the curing heater apparatus 104.

The transfer conveyor 105 is structured to stop while each apparatus is performing a manufacturing step, and is structured to restart, when the apparatus finishes the manufacturing step, to transfer the stacked core 4d to an apparatus that performs a next step.

Further, the manufacturing system 200 for the rotor core 4 is structured such that the transfer conveyor 105 simultaneously transfers a plurality of stacked cores 4d that is arranged in a line. Thus, for example, when one of the stacked cores 4d is located in the curing heater apparatus 104, the next one of the stacked cores 4d is located in the resin injection apparatus 103. That is, each of the plurality of stacked cores 4d arranged in a line is located in a different apparatus.

(Rotor Core Manufacturing Method)

Figure 6:
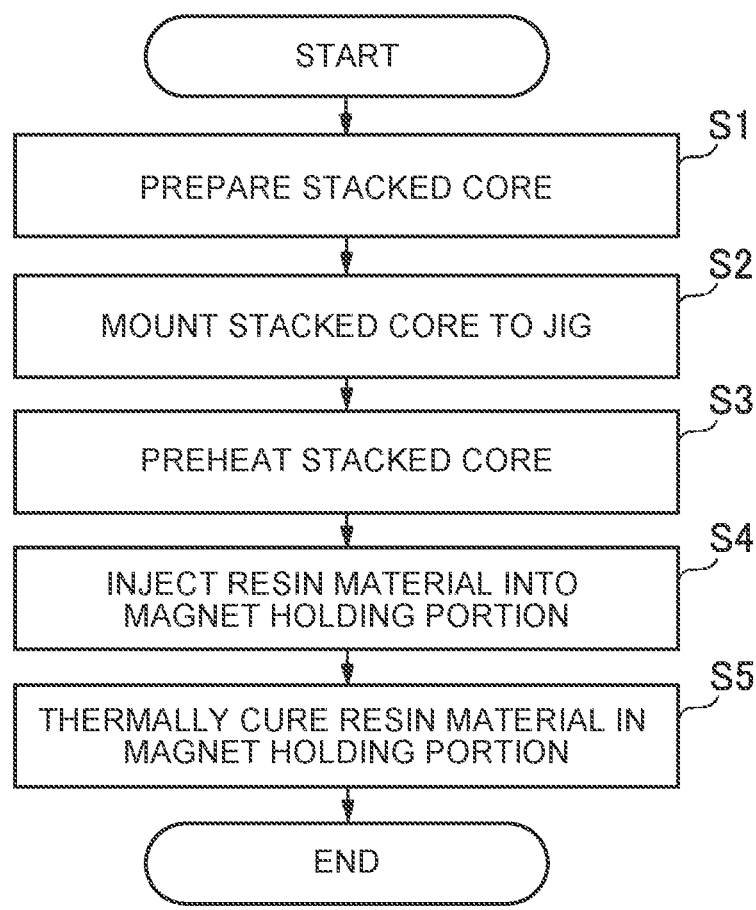
FIG. 6 is a flowchart illustrating a rotor core manufacturing method according to the present embodiment.
Figure 7:
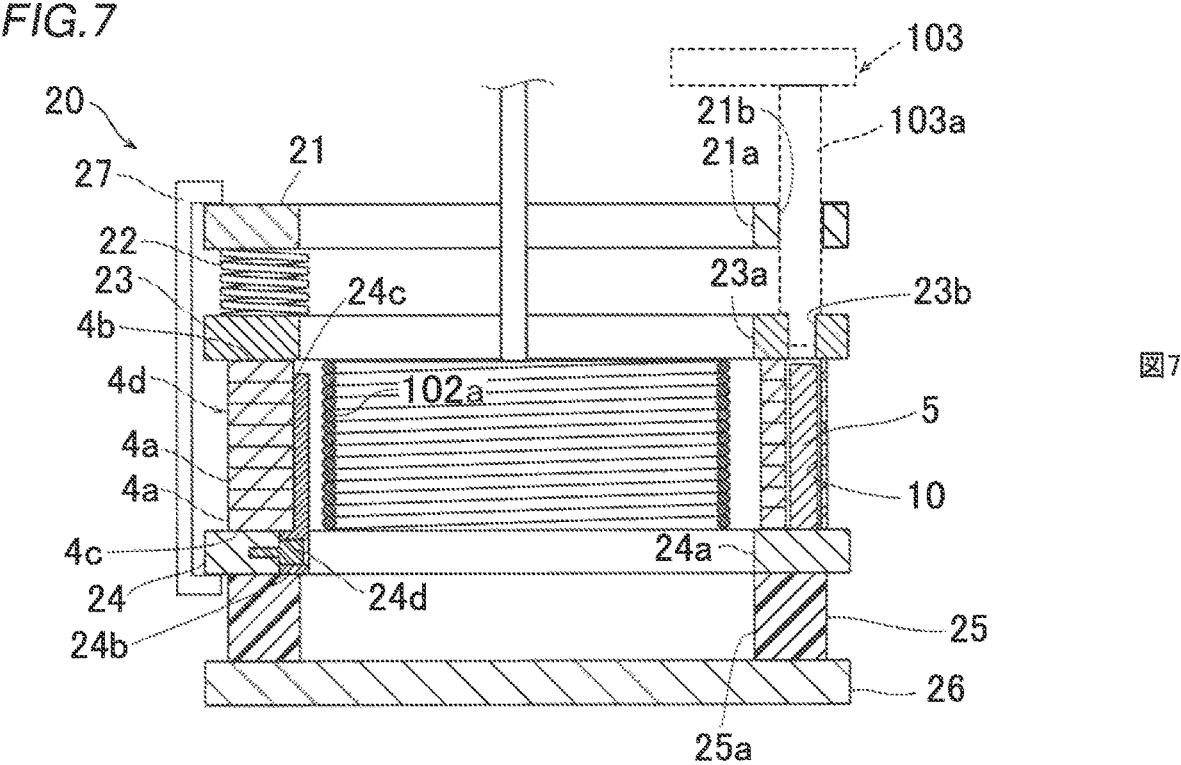
FIG. 7 is a diagram illustrating the structure of a rotor core manufacturing apparatus according to the present embodiment.

Next, referring to FIG. 6, the manufacturing method for the rotor core 4 is described.

First, as illustrated in FIG. 6, in step S1, a step of preparing the stacked core 4d is performed. Specifically, the stacked core 4d is formed by stacking the plurality of electrical steel sheets 4a together. At this time, the magnet holding portions 10 that extend in the stack direction of the electrical steel sheets 4a are formed in the stacked core 4d by press working.

Then, in step S2, steps of mounting the stacked core 4d to the jig 20 are performed in the assembly apparatus 101. In these steps, the stacked core 4d is mounted to the jig 20 such that the stacked core 4d is held and pressed in the vertical direction (in the direction Z) between the upper plate 21 (the pressing plate 23) and the lower plate 24. Specifically, first, a step of placing (putting) the stacked core 4d on the lower plate 24 is performed. Next, a step of placing the permanent magnets 5 in the magnet holding portions 10 are performed while the stacked core 4d remains on the lower plate 24. Then, the lower plate 24 and the upper plate 21 are clamped (coupled) together by the clamping member 27 so that the top surface 4b of the stacked core 4d is pressed by the pressing plate 23. It is noted that the steps of mounting the stacked core 4d to the jig 20 (the steps in step S2) are steps of mounting the stacked core 4d to the jig 20 that is provided with the thermal insulator 25.

Next, in step S3, a step of preheating the stacked core 4d is performed. Specifically, the preheating heater apparatus 102 performs the preheating step by heating the stacked core 4d that remains mounted to the jig 20 at the temperature that is greater than or equal to the first temperature T1 and less than the second temperature T2.

The manufacturing method for the rotor core 4 further includes a step of moving the stacked core 4d that remains mounted to the jig 20 from the assembly apparatus 101 to the resin injection apparatus 103 by transferring the stacked core 4d by the transfer conveyor 105. Specifically, this step includes: a step (a step between step S2 and step S3) of moving the stacked core 4d by transferring the stacked core 4d from the assembly apparatus 101 to the preheating heater apparatus 102 by the transfer conveyor 105; and a step (a step between step S3 and step S4) of moving the stacked core 4d by transferring the stacked core 4d from the preheating heater apparatus 102 to the resin injection apparatus 103 by the transfer conveyor 105.

Next, in step S4, a step of injecting the resin material 6 into the magnet holding portions 10 is performed. Specifically, the step of injecting the resin material 6 that has been melted at the first temperature T1 or greater into the magnet holding portions 10 is performed in the resin injection apparatus 103, while the stacked core 4d remains mounted to the jig 20 and while the permanent magnets 5 remain inserted in the magnet holding portions 10.

It is noted here that according to the present embodiment, the step (the step in step S4) of injecting the resin material 6 into the magnet holding portions 10 in the resin injection apparatus 103 is a step of injecting, the resin material 6 that has been melted from a solid state to a liquid state by being heated in the resin injection apparatus 103 at a temperature greater than or equal to the first temperature T1 and less than the second temperature T2, into the magnet holding portions 10 by the resin injection apparatus 103. That is, the resin injection apparatus 103 is structured to be capable of changing the resin material 6 that is stored in a solid state in the resin injection apparatus 103 into a liquid state by melting the resin material 6 using a heating heater or the like provided to the resin injection apparatus 103.

The manufacturing method for the rotor core 4 further includes a step (a step between step S4 and step S5) of moving the stacked core 4d that remains mounted to the jig 20 and that has the resin material 6 injected in the magnet holding portions 10, from the resin injection apparatus 103 to the curing heater apparatus 104 by transferring the stacked core 4d by the transfer conveyor 105. That is, while being pressed by the jig 20, the stacked core 4d is transferred from the resin injection apparatus 103 to the curing heater apparatus 104 that is separate from the resin injection apparatus 103.

It is noted here that according to the present embodiment, the step of moving the stacked core 4d from the assembly apparatus 101 to the preheating heater apparatus 102, the step of moving the stacked core 4d from the preheating heater apparatus 102 to the resin injection apparatus 103, and the step of moving the stacked core 4d from the resin injection apparatus 103 to the curing heater apparatus 104 include a step of moving the stacked core 4d from the assembly apparatus 101 to the preheating heater apparatus 102 to the resin injection apparatus 103 to the curing heater apparatus 104, by transferring the stacked core 4d by the transfer conveyor 105, while the stacked core 4d remains mounted to the same jig 20. That is, after being mounted to the jig 20 in the assembly apparatus 101, the stacked core 4d is transferred from the assembly apparatus 101 to the preheating heater apparatus 102 to the resin injection apparatus 103 to the curing heater apparatus 104 without being unmounted from the jig 20 even once.

Further, the step of moving (transferring) the stacked core 4d from the assembly apparatus 101 to the preheating heater apparatus 102 to the resin injection apparatus 103 to the curing heater apparatus 104 is a step of moving the stacked core 4d that remains mounted to the jig 20 provided with the thermal insulator 25 from the assembly apparatus 101 to the preheating heater apparatus 102 to the resin injection apparatus 103 to the curing heater apparatus 104. That is, the stacked core 4d is moved (transferred) from the assembly apparatus 101 to the preheating heater apparatus 102 to the resin injection apparatus 103 to the curing heater apparatus 104 while the thermal insulation effect of the thermal insulator 25 on the positioning plate 26 is maintained.

Next, in step S5, a step of thermally curing the resin material 6 in the magnet holding portions 10 is performed by heating the stacked core 4d. Specifically, the step of thermally curing the resin material 6 in the magnet holding portions 10 is performed by heating, the stacked core 4d that remains mounted to the jig 20 and that has the resin material 6 injected in the magnet holding portions 10, at the second temperature T2 or greater in the curing heater apparatus 104.

It is noted that the thermal insulation effect of the thermal insulator 25 on the positioning plate 26 is maintained also during this step.

Effects of Present Embodiment

The present embodiment provides the following effects.

According to the present embodiment, as described above, a manufacturing method for a rotor core (4) includes: a step of preparing a stacked core (4d) in which a plurality of electrical steel sheets (4a) is stacked together and that has a magnet holding portion (10) extending in a stack direction of the plurality of electrical steel sheets (4a); a step of placing a permanent magnet (5) in the magnet holding portion (10), and a step of mounting the stacked core (4d) to a jig (20) that presses the stacked core (4d) in the stack direction. Further, the manufacturing method for the rotor core (4) includes a step of injecting a resin material (6) in a molten state into the magnet holding portion (10) in a resin injection apparatus (103), while the stacked core (4d) remains mounted to the jig (20) and while the permanent magnet (5) remains inserted in the magnet holding portion (10). Further, the manufacturing method for the rotor core (4) includes a step of moving the stacked core (4d) that remains mounted to the jig (20) and that has the resin material (6) injected in the magnet holding portion (10), from the resin injection apparatus (103) to a curing heater apparatus (104) that is separate from the resin injection apparatus (103). Further, the manufacturing method for the rotor core (4) includes a step of curing the resin material (6) in the magnet holding portion (10), after the step of moving the stacked core (4d) to the curing heater apparatus (104), by heating the stacked core (4d) that remains mounted to the jig (20) and that has the resin material (6) injected in the magnet holding portion (10) in the curing heater apparatus (104).

This ensures that the step of injecting the resin material (6) and the step of curing the resin material (6) are performed in separate apparatuses, thus allowing prevention of an excessive increase in the time for which the resin injection apparatus (103) is occupied. That is, when the plurality of rotor cores (4) is manufactured in succession on a manufacturing line where a plurality of apparatuses performs steps in turn, it is possible to prevent the stacked core (4d) which has undergone a step before the resin injection step from waiting for a much longer time to proceed to the resin injection step. This permits a reduction in the manufacturing time of the rotor core (4) when the plurality of rotor cores (4) is manufactured in succession, thus allowing a suppression of decrease in productivity of the rotor core (4). Further, since the stacked core (4d) is moved from the resin injection apparatus (103) to the curing heater apparatus (104) while mounted to the jig (20), it is possible to prevent the resin material (6) from leaking from between the electrical steel sheets (4a) during the movement.

Further, according to the present embodiment, as described above, the step of moving the stacked core (4d) to the curing heater apparatus (104) is a step of transferring the stacked core (4d) that remains mounted to the jig (20) and that has the resin material (6) injected in the magnet holding portion (10), from the resin injection apparatus (103) to the curing heater apparatus (104) by a transfer mechanism (105). This structure allows the step of transferring the stacked core (4d) from the resin injection apparatus (103) to the curing heater apparatus (104) to be automated by the transfer mechanism (105). As a result, it is possible to reduce manpower required to manufacture the rotor core (4).

Further, according to the present embodiment, as described above, the resin material (6) is structured to melt at a first temperature (T1) or greater and to cure at a second temperature (T2) or greater, the second temperature (T2) being greater than the first temperature (T1). Further, the step of injecting the resin material (6) into the magnet holding portion (10) in the resin injection apparatus (103) is a step of injecting the resin material (6) that has been melted from a solid state to a liquid state by being heated in the resin injection apparatus (103) at a temperature greater than or equal to the first temperature (T1) and less than the second temperature (T2), into the magnet holding portion (10) by the resin injection apparatus (103). Further, the step of curing the resin material (6) is a step of curing the resin material (6) in the magnet holding portion (10) by heating the resin material (6) at the second temperature (T2) or greater in the curing heater apparatus (104). This structure ensures that the resin material (6) is heated in the resin injection apparatus (103) at a temperature less than the second temperature (T2) at which the resin material (6) cures, thus making it possible to easily prevent the resin material (6) from curing in the resin injection apparatus (103). As a result, it is possible to prevent cured residual resin from being formed in the resin injection apparatus (103). It is noted here that the resin material (6) remaining in the resin injection apparatus (103) is discarded without being used. Therefore, by preventing cured residual resin from being formed in the resin injection apparatus (103), it is possible to increase the efficiency of use (to increase the yield) of the resin material (6).

Further, according to the present embodiment, as described above, the step of mounting the stacked core (4*d*) to the jig (20) is a step of mounting the stacked core (4*d*) to the jig (20) in an assembly apparatus (101) that is separate from both the resin injection apparatus (103) and the curing heater apparatus (104). Further, the manufacturing method for the rotor core (4) includes a step of moving the stacked core (4*d*) that remains mounted to the jig (20) from the assembly apparatus (101) to the resin injection apparatus (103). Further, the step of moving the stacked core (4*d*) from the assembly apparatus (101) to the resin injection apparatus (103) and the step of moving the stacked core (4*d*) from the resin injection apparatus (103) to the curing heater apparatus (104) include a step of moving the stacked core (4*d*) from the assembly apparatus (101) to the resin injection apparatus (103) to the curing heater apparatus (104) while the stacked core (4*d*) remains mounted to the same jig (20). This structure enables separate apparatuses to perform the step of assembling the stacked core (4*d*) to the jig (20), the step of injecting the resin material (6), and the step of curing the resin material (6), thus allowing prevention of excessive increases in the times for which the assembly apparatus (101), the resin injection apparatus (103), and the curing heater apparatus (104) are occupied. As a result, when a plurality of rotor cores (4) is manufactured in succession on a manufacturing line where a plurality of apparatuses performs steps in turn, it is possible to further reduce the manufacturing time of the rotor core (4). Further, by moving the stacked core (4*d*) from the assembly apparatus (101) to the resin injection apparatus (103) to the curing heater apparatus (104) while the stacked core (4*d*) remains mounted to the same jig (20), it is possible to prevent an increase in types of jigs (20). In addition, this eliminates the need to unmount the stacked core (4*d*) from the jig (20), thus allowing prevention of an increase in the manufacturing time of the rotor core (4).

Further, according to the present embodiment, as described above, the manufacturing method for the rotor core (4) includes a step of performing preheating by heating the stacked core (4*d*) that remains mounted to the jig (20) in a preheating heater apparatus (102) that is separate from the assembly apparatus (101), the resin injection apparatus (103), and the curing heater apparatus (104), after the step of mounting the stacked core (4*d*) to the jig (20) in the assembly apparatus (101) and before the step of injecting the resin material (6) into the magnet holding portion (10) in the resin injection apparatus (103). Further, the step of moving the stacked core (4*d*) from the assembly apparatus (101) to the resin injection apparatus (103) includes a step of moving the stacked core (4*d*) from the assembly apparatus (101) to the preheating heater apparatus (102) and a step of moving the stacked core (4*d*) from the preheating heater apparatus (102) to the resin injection apparatus (103). The step of moving the stacked core (4*d*) from the assembly apparatus (101) to the preheating heater apparatus (102), the step of moving the stacked core (4*d*) from the preheating heater apparatus (102) to the resin injection apparatus (103), and the step of moving the stacked core (4*d*) from the resin injection apparatus (103) to the curing heater apparatus (104) include a step of moving the stacked core (4*d*) from the assembly apparatus (101) to the preheating heater apparatus (102) to the resin injection apparatus (103) to the curing heater apparatus (104) in this order while the stacked core (4*d*) remains mounted to the same jig (20).

This structure enables separate apparatuses to perform the step of assembling the stacked core (4*d*) to the jig (20), the step of preheating the stacked core (4*d*), the step of injecting the resin material (6), and the step of curing the resin material (6), thus allowing prevention of excessive increases in the times for which the assembly apparatus (101), the preheating heater apparatus (102), the resin injection apparatus (103), and the curing heater apparatus (104) are occupied. As a result, when a plurality of rotor cores (4) is manufactured in succession, it is possible to further reduce the manufacturing time of the rotor core (4). Further, by moving the stacked core (4*d*) from the assembly apparatus (101) to the preheating heater apparatus (102) to the resin injection apparatus (103) to the curing heater apparatus (104) while the stacked core (4*d*) remains mounted to the same jig (20), it is possible to prevent an increase in types of jigs (20). In addition, this eliminates the need to unmount the stacked core (4*d*) from the jig (20), thus allowing more effective prevention of an increase in the manufacturing time of the rotor core (4). Further, by preheating the stacked core (4*d*) by the preheating heater apparatus (102), it is possible to allow the stacked core (4*d*) to be in a high temperature state when the resin material (6) is injected into the magnet holding portion (10). As a result, it is possible to easily inject the resin material (6) into the magnet holding portion (10).

Further, according to the present embodiment, as described above, the step of moving the stacked core (4*d*) from the assembly apparatus (101) to the preheating heater apparatus (102) to the resin injection apparatus (103) to the curing heater apparatus (104) in this order is a step of transferring the stacked core (4*d*) that remains mounted to the jig (20) from the assembly apparatus (101) to the preheating heater apparatus (102) to the resin injection apparatus (103) to the curing heater apparatus (104) in this order by a transfer mechanism (105). This structure allows transfer from the assembly apparatus (101) to the curing heater apparatus (104) to be automated by the transfer mechanism (105). As a result, it is possible to further reduce manpower required to manufacture the rotor core (4).

Further, according to the present embodiment, as described above, the step of mounting the stacked core (4d) to the jig (20) is a step of mounting the stacked core (4d) to the jig (20) that is provided with a thermal insulator (25). Further, the step of moving the stacked core (4d) from the assembly apparatus (101) to the preheating heater apparatus (102) to the resin injection apparatus (103) to the curing heater apparatus (104) in this order is a step of moving the stacked core (4d) that remains mounted to the jig (20) provided with the thermal insulator (25) from the assembly apparatus (101) to the preheating heater apparatus (102) to the resin injection apparatus (103) to the curing heater apparatus (104) in this order. This structure allows the stacked core (4d) to be thermally insulated by the thermal insulator (25) during the movement of the stacked core (4d) from the assembly apparatus (101) to the preheating heater apparatus (102) to the resin injection apparatus (103) to the curing heater apparatus (104). As a result, the thermal insulator (25) is capable of preventing the jig (20) from being heated and damaged (broken) by the transfer of heat from the stacked core (4d) to the jig (20). In addition, the thermal insulator (25) is capable of maintaining heat of the preheated (preliminarily heated) stacked core (4d) until the stacked core (4d) is moved to the resin injection apparatus (103).

Further, according to the present embodiment, as described above, a manufacturing system (200) for a rotor core (4) includes a resin injection apparatus (103) configured to inject a resin material (6) in a molten state into the magnet holding portion (10) of the stacked core (4d), while the stacked core (4d) remains mounted to a jig (20) that presses the stacked core (4d) in the stack direction thereof and while a permanent magnet (5) remains inserted in the magnet holding portion (10). Further, the manufacturing system (200) for the rotor core (4) includes a curing heater apparatus (104) configured to cure the resin material (6) in the magnet holding portion (10) by heating the stacked core (4d) that remains mounted to the jig (20) and that has the resin material (6) injected in the magnet holding portion (10). Furthermore, the manufacturing system (200) for the rotor core (4) includes a moving mechanism (105) configured to move the stacked core (4d) that remains mounted to the jig (20) and that has the resin material (6) injected in the magnet holding portion (10) from the resin injection apparatus (103) to the curing heater apparatus (104).

Further, according to the present embodiment, as described above, the step of mounting the stacked core (4d) to the jig (20) is a step of mounting the stacked core (4d) to the jig (20) such that the stacked core (4d) is held and pressed in a vertical direction between an upper plate (21) that is included in the jig (20) and a lower plate (24) that is included in the jig (20). This ensures that the stacked core (4d) is held and pressed between the upper plate (21) and the lower plate (24), thus allowing stable fixation of the stacked core (4d) to the jig (20).

This ensures that the step of injecting the resin material (6) and the step of curing the resin material (6) are performed in separate apparatuses, thus allowing prevention of an excessive increase in the time for which the resin injection apparatus (103) is occupied. That is, when a plurality of rotor cores (4) is manufactured in succession on a manufacturing line where a plurality of apparatuses performs steps in turn, it is possible to prevent the stacked core (4d) which has undergone a step before the resin injection step from waiting for a much longer time to proceed to the resin injection step. This permits a reduction in the manufacturing time of the rotor core (4) when a plurality of rotor cores (4) is manufactured in succession, thus making it possible to provide a rotor core (4) manufacturing system (200) capable of suppressing a reduction in productivity of the rotor core (4). Further, since the moving mechanism (105) moves the stacked core (4d) that remains mounted to the jig (20) from the resin injection apparatus (103) to the curing heater apparatus (104), it is possible to provide a rotor core (4) manufacturing system (200) capable of preventing the resin material (6) from leaking from between the electrical steel sheets (4a) during the movement.

Further, according to the present embodiment, as described above, the moving mechanism (105) includes a transfer conveyor (105). This structure allows transfer of the stacked core (4d) from the resin injection apparatus (103) to the curing heater apparatus (104) to be automated by the transfer conveyor (105). As a result, it is possible to reduce manpower required to manufacture the rotor core (4).

[Modifications]

The embodiment disclosed above is to be considered in all respects as illustrative and not restrictive. The scope of the present disclosure is defined by the claims, not the description of the above embodiment, and includes all changes (modifications) that fall within the scope of the claims and the equivalents thereof.

For example, although the above embodiment illustrates by example that the stacked core 4d is transferred by the transfer conveyor 105 (a transfer mechanism, a moving mechanism), the present disclosure is not limited to this. For example, the stacked core 4d may be moved by an operator (by man power).

Further, although the above embodiment illustrates by example that the stacked core 4d is transferred by the transfer conveyor 105 (a moving mechanism, a transfer mechanism), the present disclosure is not limited to this. The stacked core 4d may be moved by a moving mechanism (e.g., a robotic arm) other than the transfer conveyor 105.

Further, although the above embodiment illustrates by example that the assembly apparatus 101, the preheating heater apparatus 102, and the resin injection apparatus 103 are separate from each other, the present disclosure is not limited to this. For example, the steps to be performed by the assembly apparatus 101, the preheating heater apparatus 102, and the resin injection apparatus 103 may be performed by a single apparatus.

Moreover, although the above embodiment illustrates by example that the preheating heater apparatus 102 and the curing heater apparatus 104 are separate from each other, the present disclosure is not limited to this. The preheating heater apparatus 102 and the curing heater apparatus 104 may be the same apparatus.

DESCRIPTION OF THE REFERENCE NUMERALS

4: ROTOR CORE
4a: ELECTRICAL STEEL SHEET
4d: STACKED CORE
5: PERMANENT MAGNET
6: RESIN MATERIAL
10: MAGNET HOLDING PORTION
20: JIG
21: UPPER PLATE
24: LOWER PLATE
25: THERMAL INSULATOR
101: ASSEMBLY APPARATUS
102: PREHEATING HEATER APPARATUS
103: RESIN INJECTION APPARATUS

104: CURING HEATER APPARATUS
105: TRANSFER CONVEYOR (TRANSFER MECHANISM, MOVING MECHANISM)
200: MANUFACTURING SYSTEM (ROTOR CORE MANUFACTURING SYSTEM)
T1: FIRST TEMPERATURE
T2: SECOND TEMPERATURE.

The invention claimed is:

1. A rotor core manufacturing method comprising:
a step of preparing a stacked core in which a plurality of electrical steel sheets is stacked together and that has a magnet holding portion extending in a stack direction of the plurality of electrical steel sheets;
a step of placing a permanent magnet in the magnet holding portion;
a step of mounting the stacked core to a jig that presses the stacked core in the stack direction;
a step of injecting a resin material in a molten state into the magnet holding portion in a resin injection apparatus, while the stacked core remains mounted to the jig and while the permanent magnet remains inserted in the magnet holding portion;
a step of moving the stacked core that remains mounted to the jig and that has the resin material injected in the magnet holding portion, from the resin injection apparatus to a curing heater apparatus that is separate from the resin injection apparatus; and
a step of curing the resin material in the magnet holding portion, after the step of moving the stacked core to the curing heater apparatus, by heating the stacked core that remains mounted to the jig and that has the resin material injected in the magnet holding portion in the curing heater apparatus.

2. The rotor core manufacturing method according to claim 1, wherein the step of moving the stacked core to the curing heater apparatus is a step of transferring the stacked core that remains mounted to the jig and that has the resin material injected in the magnet holding portion, from the resin injection apparatus to the curing heater apparatus by a transfer mechanism.

3. The rotor core manufacturing method according to claim 1, wherein
the resin material is structured to melt at a first temperature or greater and to cure at a second temperature or greater, the second temperature being greater than the first temperature,
the step of injecting the resin material into the magnet holding portion in the resin injection apparatus is a step of injecting the resin material that has been melted from a solid state to a liquid state by being heated in the resin injection apparatus at a temperature greater than or equal to the first temperature and less than the second temperature, into the magnet holding portion by the resin injection apparatus, and
the step of curing the resin material is a step of curing the resin material in the magnet holding portion by heating the resin material at the second temperature or greater in the curing heater apparatus.

4. The rotor core manufacturing method according to claim 1, wherein
the step of mounting the stacked core to the jig is a step of mounting the stacked core to the jig in an assembly apparatus that is separate from the curing heater apparatus,
the method further comprising a step of moving the stacked core that remains mounted to the jig from the assembly apparatus to the resin injection apparatus, wherein
the step of moving the stacked core from the assembly apparatus to the resin injection apparatus and the step of moving the stacked core from the resin injection apparatus to the curing heater apparatus include a step of moving the stacked core from the assembly apparatus to the resin injection apparatus to the curing heater apparatus while the stacked core remains mounted to the same jig.

5. The rotor core manufacturing method according to claim 4,
further comprising a step of performing preheating by heating the stacked core that remains mounted to the jig in a preheating heater apparatus that is separate from the assembly apparatus, the resin injection apparatus, and the curing heater apparatus, after the step of mounting the stacked core to the jig in the assembly apparatus and before the step of injecting the resin material into the magnet holding portion in the resin injection apparatus, wherein
the step of moving the stacked core from the assembly apparatus to the resin injection apparatus includes a step of moving the stacked core from the assembly apparatus to the preheating heater apparatus and a step of moving the stacked core from the preheating heater apparatus to the resin injection apparatus, and
the step of moving the stacked core from the assembly apparatus to the preheating heater apparatus, the step of moving the stacked core from the preheating heater apparatus to the resin injection apparatus, and the step of moving the stacked core from the resin injection apparatus to the curing heater apparatus include a step of moving the stacked core from the assembly apparatus to the preheating heater apparatus to the resin injection apparatus to the curing heater apparatus in this order while the stacked core remains mounted to the same jig.

6. The rotor core manufacturing method according to claim 5, wherein the step of moving the stacked core from the assembly apparatus to the preheating heater apparatus to the resin injection apparatus to the curing heater apparatus in this order is a step of transferring the stacked core that remains mounted to the jig from the assembly apparatus to the preheating heater apparatus to the resin injection apparatus to the curing heater apparatus in this order by a transfer mechanism.

7. The rotor core manufacturing method according to claim 5, wherein
the step of mounting the stacked core to the jig is a step of mounting the stacked core to the jig that is provided with a thermal insulator, and
the step of moving the stacked core from the assembly apparatus to the preheating heater apparatus to the resin injection apparatus to the curing heater apparatus in this order is a step of moving the stacked core that remains mounted to the jig provided with the thermal insulator from the assembly apparatus to the preheating heater apparatus to the resin injection apparatus to the curing heater apparatus in this order.

8. The rotor core manufacturing method according to claim 1, wherein the step of mounting the stacked core to the jig is a step of mounting the stacked core to the jig such that the stacked core is held and pressed in a vertical direction between an upper plate that is included in the jig and a lower plate that is included in the jig.

\* \* \* \* \*